(12) United States Patent
Hammon et al.

(10) Patent No.: US 11,398,905 B2
(45) Date of Patent: *Jul. 26, 2022

(54) CRYPTOGRAPHIC SYSTEMS AND METHODS FOR MODIFICATION OF POOLS OF RANDOM NUMBERS

(71) Applicant: 7Tunnels, Inc., Park City, UT (US)

(72) Inventors: Michael L. Hammon, Ames, IA (US); Wesley A. Hildebrandt, Sussex, WI (US); David Wiener, Park City, UT (US); Kevin R. McCarthy, Park City, UT (US)

(73) Assignee: 7Tunnels Inc., Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,302

(22) Filed: Nov. 16, 2020

(65) Prior Publication Data

US 2021/0083870 A1  Mar. 18, 2021

Related U.S. Application Data

(63) Continuation of application No. 16/959,244, filed as application No. PCT/US2019/013183 on Jan. 11, 2019, now Pat. No. 10,855,459.

(60) Provisional application No. 62/617,984, filed on Jan. 16, 2018.

(51) Int. Cl.
*H04L 9/08* (2006.01)
*G06F 7/58* (2006.01)
*H04L 9/06* (2006.01)

(52) U.S. Cl.
CPC ............ *H04L 9/0869* (2013.01); *G06F 7/588* (2013.01); *H04L 9/0662* (2013.01)

(58) Field of Classification Search
CPC ..... H04L 9/0869; H04L 9/0662; H04L 63/20; H04L 67/1023; H04L 9/0656; G06F 7/588; G06F 7/58
See application file for complete search history.

(56) References Cited

U.S. PATENT DOCUMENTS

| 6,687,375 | B1 | 2/2004 | Matyas, Jr. et al. |
| 2005/0008154 | A1 | 1/2005 | Sarkar |
| 2006/0177065 | A1 | 8/2006 | Halbert |
| 2014/0244785 | A1 | 8/2014 | Potlapally et al. |
| 2016/0315763 | A1 | 10/2016 | Hammon et al. |
| 2017/0170957 | A1 | 6/2017 | Smith et al. |
| 2017/0295012 | A1 | 10/2017 | Durand |

FOREIGN PATENT DOCUMENTS

WO    WO2019143528    7/2019

OTHER PUBLICATIONS

Hughes et al., Strengthening the Security Foundation of Cryptography with Whitewood's Quantum-Powered Entropy Engine, Whitewood Encryption Systems, Inc., Jan. 2016, 28 pp.
PCT International Patent Application No. PCT/US2019/013183, International Search Report and Written Opinion dated Apr. 1, 2019, 8 pp.

*Primary Examiner* — Brian F Shaw
(74) *Attorney, Agent, or Firm* — Phillips Winchester (57) ABSTRACT

Systems and methods include modifying a random number pool using one or more user-identified randomization processes to produce a modified RN pool with a user-specific modification that is unknown to or otherwise separated from a RN provider. Systems and methods also include sending and receiving encrypted messages that are encrypted and decrypted using the modified RN pool.

18 Claims, 4 Drawing Sheets

CRYPTOGRAPHIC SYSTEMS AND METHODS FOR MODIFICATION OF POOLS OF RANDOM NUMBERS

CROSS-REFERENCE TO RELATED APPLICATIONS

This application is a continuation of U.S. patent application Ser. No. 16/959,244, filed Jun. 30, 2020, which application is a national phase entry under 35 U.S.C. § 371 of International Patent Application PCT/US2019/013183, filed Jan. 11, 2019, designating the United States of America and published in English as International Patent Publication WO 2019/143528 on Jul. 25, 2019 for "Cryptographic Systems and Methods for Modification of Pools of Truly Random Numbers," which claims priority to U.S. Provisional Patent Application No. 62/617,984, filed Jan. 16, 2018, the disclosures of each of which are hereby incorporated herein in their entirety by this reference.

TECHNICAL FIELD

Embodiments of the present disclosure relate generally to cryptography and more specifically to encryption and decryption using data and structures similar to one-time pads.

BACKGROUND

Cryptography is important for many types of communications including, but certainly not limited to, communications involving financial data, medical data, and government classified data. Many types of encryption are very difficult to decrypt, but can eventually be broken. Other types of encryption have significant vulnerabilities making decryption relatively easy. Conventional one-time pads are generally considered completely secure and unbreakable. However, conventional one-time pads have a drawback related to how to convey the one-time pads to keep them secret. In particular, if one-time pads are distributed to the communicants by a third party, additional security steps are advised to ensure that only the communicants have the information necessary to decrypt their communications.

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g. 110) and specifically indicated for a given instantiation by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Headings may be included herein to aid in locating certain sections of detailed description. These headings should not be considered to limit the scope of the concepts described under any specific heading. Furthermore, concepts described in any specific heading are generally applicable in other sections throughout the entire specification.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

Before describing specific embodiments, and in order to facilitate description in the present disclosure, various terms are described herein. Where ambiguity may exist between the plain meaning, dictionary meaning, and the term as described herein, a person of ordinary skill in the art will recognize the term as described herein will best conform to a more comprehensive understanding of embodiments of the present disclosure.

A "one time pad" (OTP) is an unbreakable encryption technique in which identical paired sets of key material are distributed to two communicants prior to their need for encrypted communication. When needed, a portion of the OTP is used by the sending communicant to encrypt a message and the matching portion is used by the receiving communicant to decrypt the message. In early implementations, OTPs were literal pads of paper with random single-letter substitutions, and after portions of one or more pages in the pad were used to encrypt a message the pages could be removed from the pad and destroyed to prevent decryption of the message by anyone other than the recipient with the matching pad.

A "Random Cipher Pad" (RCP) is similar to, but different from, an OTP according to embodiments of the present disclosure. The term RCP may be used as a generic term for various species of RCPs. An RCP is a collection, which may be a file, of truly random numbers, e.g., gathered from one or more "True Random Number Generators" (TRNGs). The use of the word "random" evokes the protection an OTP offers by alluding to the truly random nature of the cipher. Although the size of the RCPs could vary between instantiations, or perhaps even within a particular instantiation, RCPs in many instances are measured in kilobytes or even larger units.

An "RCP pool" is a collection of RCPs. Each RCP within an RCP pool may be identified by a number that is unique within that pool (e.g., a sequential integer). Globally Unique IDentifiers (GUIDs), each comprising a unique 128-bit number, may be used as identifiers such that careful construction of this number can guarantee global uniqueness within any particular system. Thus, in some embodiments, each RCP pool may be identified with a GUID. Moreover, while a simple sequential identifier may be used to identify each RCP within an RCP pool, a GUID, a hash of the RCP, or other type of unique identifier may be used instead to identify each RCP within an RCP pool.

A "True Random Number Generator" (TRNG) is a hardware device, and associated software if needed, used to generate truly random numbers from an unpredictable quantum or non-quantum physical process. Quantum examples of these processes include nuclear decay, photons transmitted through a partially transparent mirror, and fluctuations in vacuum energy. Non-quantum examples include thermal noise, clock drift, and RF noise.

While embodiments of the disclosure are generally described with reference to a truly random numbers and a TRNG, in other embodiments, other type of random number configurations and associated generators may by utilized.

A "True Random Number (TRN) pool" is a set of true random numbers generated by a TRNG hardware device, and associated software if needed. A QRN pool is a species of a generic TRN pool wherein the true random numbers in the pool are generated by a quantum process. The terms "set" and "pool" may be used interchangeably within this description. In other words, this description may use TRN pool and TRN set interchangeably and QRN pool and QRN set interchangeably. In addition, a TRN pool may be configured as a pool of individually selectable and addressable RCPs such as the RCP pool described above.

A "Data RCP" is a species of RCP used to encrypt and decrypt communications between two or more endpoints.

A "Random Cypher Key" (RCK) is a data RCP, a portion of a Data RCP, a combination of two or more data RCPs, or a combination of portions of two or more Data RCPs such that the RCK has a length corresponding to a length of a message that is to be operated on by the RCK.

A "Key RCP" is a species of an RCP used to encrypt and decrypt a Data RCP to securely transfer it electronically. Each Key RCP is only used once.

"Mapping" is a process of converting a Data RCP, once used, into a Key RCP for secure transfer of a subsequent Data RCP.

A "mapping index" is a list of numbers that includes the integers from one through the number of units (e.g., bytes, words, etc.) in a Data RCP in random order. The mapping index may be encrypted and sent to the appropriate endpoints of a particular communication channel and may be used as part of the process to convert Data RCPs into Key RCPs.

The terms "unencrypted," "unencrypted data," "unencrypted data structure," "unencrypted message," "clear text," and "plain text" refer to data that is not encrypted.

The terms "encrypted," "encrypted data," "encrypted data structure," "encrypted message," and "cipher text" refer to data that has passed through an encryption process according to embodiments of the present disclosure. As a non-limiting example, encrypted data may be generated by performing a bitwise exclusive-OR between a plain text message and a random number from a TRN pool.

The terms "decrypted," "decrypted data," "decrypted data structure," and "decrypted message" refer to data that was previously encrypted and has been returned to its original value. As a non-limiting example, decrypted data may be generated by performing a bitwise exclusive-OR between an encrypted message and the same random number from a TRN pool that was used to encrypt the plain text message. Decrypted data may also be referred to as "clear text," or "plain text." Thus, plain text and clear text may refer to data before encryption or data after decryption.

The term "commutative" refers to a characteristic of the application of multiple RCPs in a manner that the order in which data is encrypted using multiple RCPs does not matter. In other words, as long as the same set of RCPs is used to encrypt and decrypt, using the RCPs in different orders for encryption and decryption will produce the same final result.

The term "pad" may be generically used herein to refer to an RCP according to embodiments of the present disclosure. In contrast, a conventional one-time pad is explicitly referred to as a conventional one-time pad or a one-time pad and not simply as a pad.

Implementation Overview

Embodiments described herein facilitate utilization of Random Cipher Pads (RCPs), which may be somewhat similar to conventional one-time pads, but generated, modified, and used in new and different ways. The RCPs are used to encrypt information (for example, documents, media streams, and data files), and, in some embodiments, they may also be used to encrypt subsequent RCPs after appropriate modification. These subsequent RCPs may in turn then be used by the original users recursively.

Conventional one-time pad encryption is generally recognized as being unbreakable. Similarly, the use of RCPs is unbreakable under the condition that (1) the RCPs are securely distributed to the communication endpoints independently of the encrypted communication channel, or (2) the Mapping process converting Data RCPs to Key RCPs is secure and unbreakable. Therefore, an endless number of RCPs can be securely used by the communicants as long as the party generating the RCPs continues to send subsequent RCPs encrypted by the preceding RCPs and the used RCPs are destroyed.

Interception of the transmission generally will not help an intruder since RCP encryption cannot be broken. At worst, the intended recipient will not receive the transmission intended for him and will contact the sender, uncovering a theft or loss of information.

In some embodiments, the initial RCP exchange installation is done "outside" the electronic environment, or done in a highly secure manner with full authentication of Sender and Recipient. This results in a situation where each subsequent RCP cannot be decrypted and therefore cannot be intercepted for use.

Conventional one-time pads are currently not practical for ubiquitous use, or even enterprise use, because each pad is a singular event and the sender and recipient(s) must have an identical pad for each transmission. Identical pads are requisite for encryption and decryption. Heretofore, conventional one-time pads between sender and receiver were exchanged using Public Key Encryption (PKE), which is breakable. The use of PKE to "secure" exchange of pads is not secure, and increasingly vulnerable. Delivering a new pad manually (e.g., by mail or courier) for each new use is impractical, costly, and inefficient; plus, the method of getting each successive pad into one or more recipients' hands creates vulnerabilities.

The following aspects, presented in separate or cumulative embodiments, present functionality opportunities possible with RCP encryption methods or processes. In general, an RCP may be used for data encryption and separately used for encrypting features of the encryption process itself. In other words:

1. The original RCP can be used to encrypt for electronic transmission a new, uncorrelated RCP that is also unbreakable.
2. The new uncorrelated RCP is encrypted using an RCP that came before it, meaning that the new RCP cannot be decrypted or used even if intercepted.
3. Multiple new RCPs can be generated and transmitted (along with the documents or information they encrypt or separately) by the original user(s).

Stated another way, embodiments of the present disclosure include apparatuses and methods for providing cryptographic procedures including remapping a current RCP into an uncorrelated random variable used for securely passing a replacement RCP. These embodiments are configured to reduce and/or eliminate attack surfaces. This recursive process implies that an initial RCP and mapping data may be installed in conjunction with original software installation as part of an end-point registration process. The initial RCP and mapping data may be configured such that they include matching data on a server or other device. In order to insure the integrity of the system, an initial install including the initial RCP should be completed using high security protocols.

In some embodiments, some or all of the encryption features described herein are implemented within a computer processor or processing device that executes the encryption procedures. The transformation of data that occurs according to the specific encryption techniques described herein render the processing device executing embodiments described herein as a special-purpose processing device capable of new functionality that is otherwise not available executing conventional software or logical procedures. Furthermore, efficient processing of such encryption procedures requires implementation within computer processing systems. Furthermore, the interactions between an electronic storage device to store data associated with the encryption techniques described herein and the computer processing devices to execute the encryption techniques described herein achieve much greater efficacy than would be possible through other non-computerized means.

It is a characteristic of RCP encryption that if an exclusive-OR (XOR) operation is used to encrypt the data then applying the exclusive XOR a second time (with the same RCP data) will decrypt the data. Therefore, the encryption and decryption processes are similar. However, encryption and decryption are not restricted to the use of XOR as the encryption operator for the RCP encoder and decoder. Any suitable symmetric operation could be used.

In some embodiments, RCP generation takes place on the computer that has the greatest resources, either on the sender's computer or on the recipient's computer. Alternatively, the RCP generation may be performed by a third-party intermediary computer or reference computer (e.g., an RCP server) and delivered in a secure fashion to each of the computers wishing to communicate with each other over a secure channel.

RCP sizes may vary in different implementations, or even over different stages of the same communications stream between sender and receiver devices.

For ease of description, data elements are generally described in terms of "bytes." However, a person of ordinary skill in the art will recognize that the data elements may be configured in many sizes suitable to different applications, such as, for example, "16, 32, or 64 bit words."

Embodiments of the present disclosure enable user modification of a given pool of key material being used for the 1) symmetric encryption/decryption (also referred to herein as symmetric cryptography) of user data or 2) symmetric cryptography of random data produced for dynamic replacement of key data used for symmetric cryptography of user data. Details of this symmetric cryptography for user data and dynamic replacement of key data may be found in U.S. patent application Ser. No. 15/134,260 filed Apr. 20, 2016 and entitled "Random Cipher Pad Cryptography," the entire disclosure of which is hereby incorporated by reference in its entirety.

Implementation Details

Figure 1:
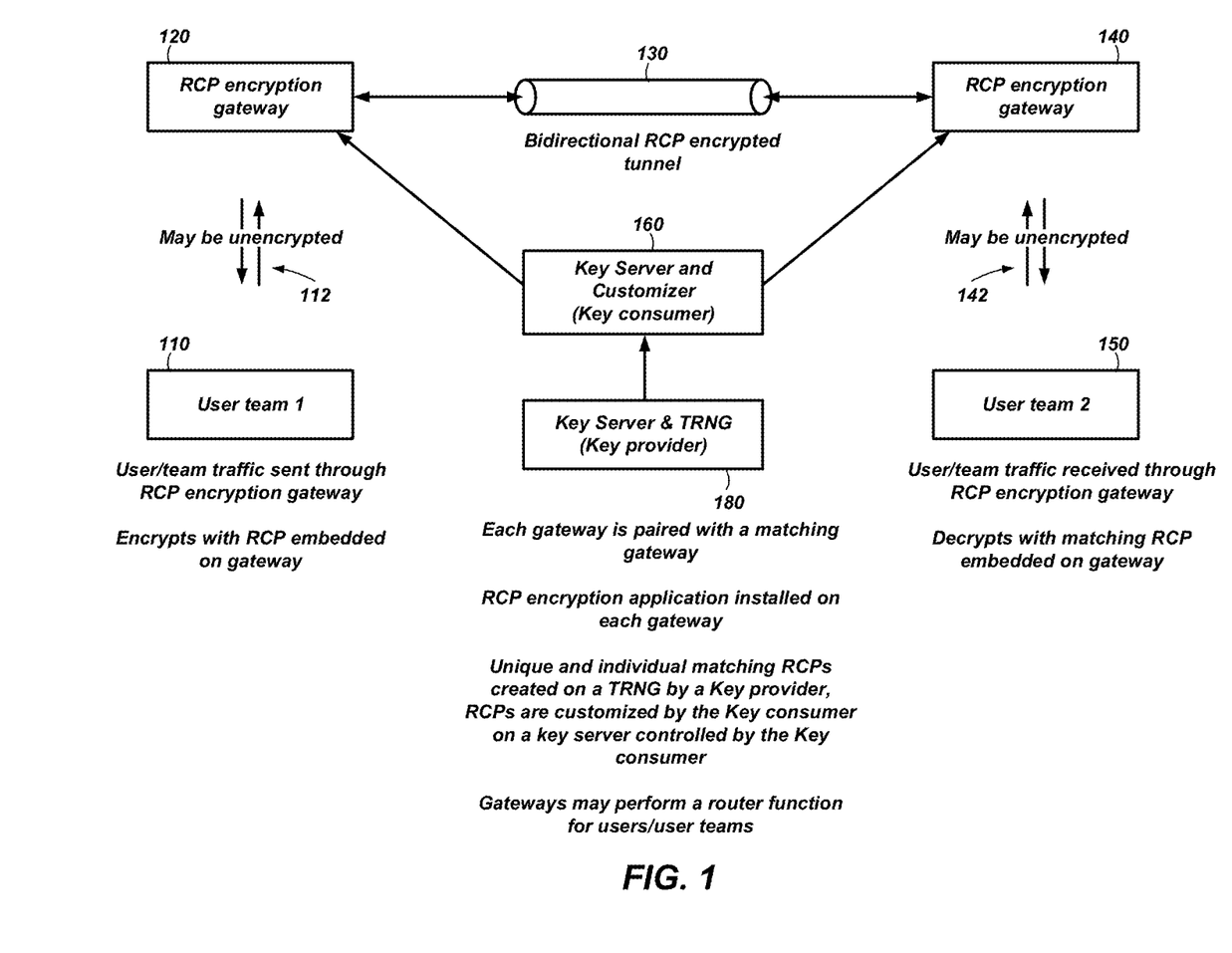
FIG. 1 is a block diagram of an encryption system using True Random Number (TRN) pools including a user customizing tool to modify the TRN pool such that the key provider no longer knows the contents of the TRN pool.

FIG. 1 is a block diagram of an encryption system using TRN pools including a user customizing tool to modify the TRN pool such that the key provider no longer knows the contents of the TRN pool. In FIG. 1, messages are communicated through one or more routers, servers, or combinations thereof including RCP cryptography. For ease of discussion, the system in FIG. 1 may be referred to as Router-to-Router (R2R) system. However, it should be understood that this system may use routers, servers, gateways, or other suitable devices for communicating with multiple clients, encrypting/decrypting client message traffic and sending/receiving encrypted messages through a bi-directional RCP encrypted tunnel 130. To emphasize this flexibility, these systems are shown as RCP encryption gateways (120, 140) in FIG. 1, but may be referred to as routers in the description.

Embodiments using Router-to-Router hardware and/or software act as a specialized solution for select applications where message traffic is being exchanged between many users in two (2) distributed locations. Similarly, embodiments using servers on one or both ends include hardware and/or software as a specialized solution for select applications where server resources are used at one or both of the distributed locations. Encryption is applied at each router as traffic enters or departs. The routers become single endpoints, paired exclusively with each other and shared by many on either end. This system may be more appropriate for operations where both ends are contained within a secure environment because all traffic between senders and their corresponding router may be in plaintext and subject to exploitation if intercepted.

R2R embodiments may be used for group collaboration under tightly controlled circumstances. Each character of every message is uniquely and individually encrypted at the router (120, 140) using a RCP containing True Random Numbers supplied either dynamically or physically installed. Every RCP is destroyed as it is consumed, never to be used again. R2R is a simplified option for collaborative and well controlled environments with several to many participants at either end.

As illustrated in FIG. 1, a key server with TRNG hardware 180 creates TRN pools of RCPs. The key server and TRNG hardware 180 is controlled by a key provider (also referred to herein as a TRN provider), which dispenses the TRN pools to a key consumer. In FIG. 1, the TRN pools are dispensed to a key server and customizer 160 (also referred to herein as a key customizer 160) controlled by the key consumer. According to embodiments of the present disclosure, a portion of the system (e.g., the key server and customizer 160) includes software methods for customizing the TRN pools from the key provider in such a way that the key provider no longer knows the content and/or order of the key data elements used in the cryptographic processes. After customizing the TRN pools, the key server and customizer 160 distributes paired RCPs to each RCP encryption gateway (120, 140). Thus, a router (120, 140) performs its normal function of communication with various user endpoints within the controlled environment along with RCP encryption functions. As a result, in some embodiments, this user endpoint (110, 150) to router (120, 140) traffic may be unencrypted. However, the RCP enabled routers (120, 140) communicate with each other with RCP encrypted messages containing messages from any of the various user endpoints on either end.

In further detail, and as a specific example of traffic flowing left to right, user team one 110 includes one or more transmitting clients, which send unencrypted messages 112 to RCP encryption gateway 120. A RCP encryption application installed on the RCP encryption gateway 120 (i.e., a sending system) encrypts the messages with RCPs stored on the RCP encryption gateway 120 and transmits the encrypted messages through the bi-directional RCP encrypted tunnel 130.

On the receiving side, a RCP encryption application installed on the RCP encryption gateway 140 (i.e., a receiving system) decrypts the messages with RCPs stored on the RCP encryption gateway 140 that correspond to the RCPs on the RCP encryption gateway 120. These decrypted messages 142 are then routed to the proper receiving clients in user team two 150.

As stated earlier, the key server and customizer 160 includes software methods for customizing the TRN pools from the key provider in such a way that the key provider no longer knows the content and/or order of the key data elements used in the cryptographic processes. Thus, the matching TRN pools, as they exist on the RCP enabled routers (120, 140), have already been modified by the user such that the key provider does not know the content of the TRN pools on the RCP enabled routers (120, 140).

The system of FIG. 1 may be considered to be a batch mode of customizing key material in the TRN pools. In a batch mode, the key material can be modified by the key consumer at a central location, then the customized TRN pools are distributed to systems for performing the encryption and/or decryption processes.

The methods of customization, which may also be referred to herein as user-identified randomization processes, may be processes that are provided to the key consumer by the key provider. In general, these customization processes may be thought of as a menu of processes that the user can select from to modify the TRN pools. Moreover, these selectable processes may be combined, or performed in sequence to further modify the TRN pools.

It should be noted that the present disclosure includes the term "user," user-specific modification," and "user-identified randomization processes." In some embodiments, the "user" may be the actual end user of a computing system that wishes to transmit or receive an encrypted message and that individual user may select the user-specific modification. However, in other embodiments, the actual end user may not have any control over the user-identified randomization processes. Instead, the user-identified randomization processes may be controlled and selected by an organization in control of the key server and customizer 160 as is described in association with FIG. 1. In addition, even with systems such as those described below in association with FIG. 2, the user-identified randomization processes may be controlled and selected by an organization in control of encryption systems such as the sending systems 210A, the receiving systems 210B, the cryptographic data server 260, or combinations thereof. In any of these systems, whether the key consumer performing user-specific modifications is the end user, the organization in control of the encryption systems (210A, 210B, 260), or the organization in control of the cryptographic data server 260, the user-specific modifications are performed by the key consumer, not by the key provider (180, 280), and the resulting values and/or order of the modified key data elements are in a randomized state unknown to the key provider.

In order to further describe the customization processes, they are generally discussed in various categories. A person of ordinary skill in the art will recognize that these categories may overlap and are used only as means to more easily describe various possible customization functions according to embodiments of the present disclosure. Thus, the customization functions may be thought of as user-identified randomization processes that: 1) reorders key data elements in the TRN pool in a pre-defined order identified by the user, 2) selects a pre-defined subset of elements within the TRN pool to be used for the cryptographic processes, and 3) applies a pre-defined warping function to the key data elements in the TRN pool. These various processes may be used alone or in combination.

Reordering Key Data Elements

The process of reordering key data elements in the TRN pool may be simple or complex. As a simple example, the user may select to use the key material in reverse order. In other words, start at the end of the entire TRN pool and proceed backwards to the start when selecting each key data element to use. This reverse order could be further modified to operate on smaller blocks, such as files within the TRN pool or block sizes, such as, for example, 1 MB blocks 1 KB blocks, etc. This simple reordering may add one bit of entropy to the original TRN pool and modify the pool in a manner unknown to the key supplier since the key supplier doesn't know whether the reverse reordering has been used and doesn't know the block size.

In a somewhat more complex option, a process may be included to select key data elements in reverse order with different block sizes. For example, a first block of 1 KBytes of key data elements is selected from the end of the TRN pool, but the key data elements within the block are not reordered. The process then proceeds to the next lower block of 1 KBytes of key data elements and the process continues until the first 1 KBytes of key data elements is selected.

In another more complex option, a process may be included to select all the even numbered key data elements the first time through a block and select all the odd numbered key data elements the next time through the block. This selection process could also be combined with reverse order processes to further customize the key material. For example, odd key data elements could be selected in a forward order and even key data elements could be selected in a reverse order.

In an even more complex option, which significantly modifies the entropy of the original TRN pool, would be to use a start-and-step function to select key data elements in the TRN pool. In this function, a step size is selected that is co-prime with the length of the key space. For example, the length of the entire TRN pool or the length of a block of key data elements in the TRN pool. As an example, a block size of 1 GByte of key space will be used. The start-and-step function selects a step size that is co-prime with the length of 1 GByte. An offset into the key space is then defined as a pointer to the first key data element to be used. For each subsequent key data element, the pointer is then modified by adding the step size to it to define next key data element to select. This addition of the step size is performed with modulo (key space size) such that the pointer wraps around when it gets larger than the key space. Using this start-and-step function, after 1 GBytes of key data elements have been used, each key data element has been used once and only once. Thus, the key data elements are now in a much different order than that supplied by the key provider and many bits of entropy have been added to the key space.

Selecting a Subset of Key Data Elements

The process of selecting a pre-defined subset of elements within the TRN pool also may be simple or complex. This process may be useful in situations where the user is not concerned with using every key data element supplied by the key provider. A process may be included to select all the even numbered key data elements in the TRN pool or select all the odd numbered key data elements in the TRN pool.

This selection process could also be performed on blocks of key data elements and discard a different number of key data elements. For example, a user could select to use 1 Kbyte blocks and discard every third block.

In a more complex process, blocks of key data elements may be combined in different ways to create new key data elements. For example, block 0 (an even numbered block) could be XORed with block 1 (an odd numbered block) to create a new block for use in the encryption/decryption processes. This XOR combination of odd blocks and even blocks could be performed through the entire length of the TRN pool.

Warping Key Data Elements

Finally, the process of applying a pre-defined warping function to the key data elements in the TRN pool may be simple or complex. This warping function may be considered as a substitution, modification, or rearrangement of individual key data elements or blocks of elements. Moreover, the warping function may be considered as two general categories related to stream cipher type modifications and block cipher type modifications.

As a simple stream cipher type modification, the user may select to modify each key data element by a fixed constant. For example, on byte-size key data elements, the user may select to add a number between 0 and 255 to the key data element modulo 256. This option would add 8 bits of entropy to the key space and basically amounts to performing a fixed rotation on every byte. In a somewhat more complex process, the constant added may vary for each data element. For example, a ramping function may be used such that on the first byte, the number 255 could be added, on the next byte, the number 254 could be added, on the next byte the number 253 could be added, and so on.

In a complex block cipher modification, blocks of the TRN pool could be encrypted with and AES-256 encryption process, or other suitable block encryption, to modify the TRN pool. This process would add significant entropy to the TRN pool.

Many other modifications are possible. For example, the starting point within the TRN pool could be changed, and instead of taking subsequent entries from the pool the system could use every second or third entry or any other step size desired. Alternatively, blocks of bytes could be rotated, where the second byte would become the first, the third would become the second, and so on, with the first byte being looped around to the end of the block. This rotation could be done in either direction and any number of times, with the number of times potentially varying from block to block. Also, the bytes in a block could be rearranged using a more complex mapping rule. All these modifications could also take place at the bit level. For example, the bits in a byte or block of bytes could be rotated or rearranged.

Combined Processes

In some embodiments, the user-identified randomization processes may be combined to create even more difference between the TRN pools supplied by the key provider and the TRN pools as they are used after user modification.

As one non-limiting example, perhaps an Information Technology (IT) manager for the user may select one or more kinds of modifications as a bulk process to be performed on all the TRN pools before they are distributed. Then, individual users, or other company officials could select another randomization process to be performed real-time as the key material is used by the users. For example, in FIG. 1 the IT manager may select an AES-256 encryption be performed by the key customizer 160 before the TRN pools are distributed to the RCP encryption gateways (120, 140). Then the RCP encryption gateways (120, 140) could perform a simple reordering of the key data elements as they are used real-time in the encryption/decryption processes.

Figure 2:
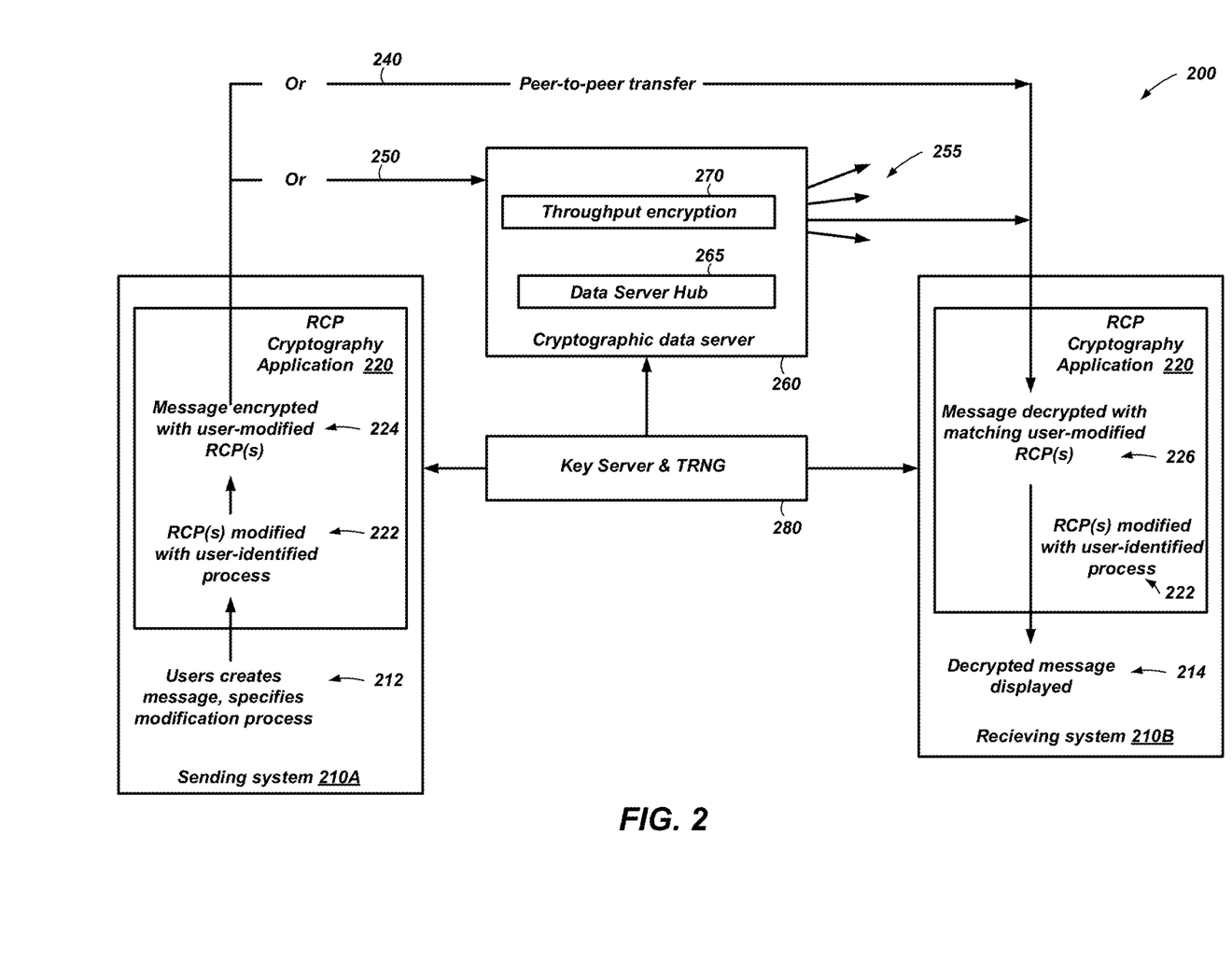
FIG. 2 is a block diagram illustrating cryptographic systems for communicating information using Random Cipher Pads (RCPs) in which the user-modification process may be performed as the messages are encrypted.

FIG. 2 is a block diagram illustrating cryptographic systems 200 for communicating information using Random Cipher Pads (RCPs) in which the user-modification process may be performed as the messages are encrypted. Embodiments of the present disclosure offer multiple different modes for bidirectional data transfer of RCP encrypted messages.

A direct mode 240 is from one single endpoint 210A (also referred to as a sending system 210A) to another endpoint 210B (also referred to as a receiving system 210B). This mode may also be referred to herein as a point-to-point mode and a peer-to-peer mode.

A throughput mode 250 may be configured as a communication between endpoints (210A and 210B) with a server 260 (also referred to as a cryptographic data server 260) managing communications and additional encryption between the endpoints (210A and 210B). The throughput mode may also be configured as a broadcast communication 255 between a sender and multiple destinations, each with its own different RCP encryption.

A Router-to-Router (R2R) mode may be thought of as a specific type of peer-to-peer transfer where the peers on each end are routers, servers, Virtual Private Network (VPN) servers, and gateways rather than user endpoints. R2R mode may be useful for bulk transfers by one or several participants all connected to the same router on either end. R2R mode encrypts traffic from one router to another router, WiFi connections and direct connection to the router may not be secured, so the R2R mode may be more appropriate to an environment where eavesdropping at each physical router location is well controlled, while communications between the routers is managed with RCP cryptography to create a RCP encrypted VPN.

For both direct transfers 240 and throughput transfers 250 a sending user creates or selects 212 the content for transfer and selects a user-specific modification process. The user-specific modification process 222 is performed by a RCP cryptography application 220 to modify the TRN pool based on the user's specifications. The RCP cryptography application 220 then uses the modified TRN pool to take the user's message as a clear text data stream and encrypt it 224 to an encrypted data stream.

Direct transfers 240 are accomplished by simply selecting a receiving system 210B that already has a paired relationship with the sending system 210A and pressing send. The receiving system 210B receives the message into the RCP cryptography application 220. The RCP cryptography application 220 on the receiving end uses the same user-specific modification process 222 to modify the TRN pool on its end based on the user's specifications. Then, the RCP cryptography application 220 uses the modified TRN pool to decrypt 226 the encrypted message to form a received clear text stream. The decrypted message may then be displayed 214 or further processed on the receiving system 210B. Used RCPs are destroyed as they are used and are never to be reused.

Throughput transfers 250 start the same way as direct transfers 240. However, in throughput transfers 250 the sending system 210A has a RCP paired relationship only with the cryptographic data server 260, which maintains multiple RCP paired relationships with various authorized end-points and, as a result, acts as a data server hub 265. The RCP cryptography application 220 on the source system 210A encrypts 224 the message with a user-modified RCP matching one on the cryptographic data server 260, the cryptographic data server 260 then performs throughput encryption 270 of the already encrypted message with a new, different user-modified RCP for each and every receiving system 210B, sending the differently encrypted message(s) 255 on to the destination system(s) 210B for decryption. Each receiving system 210B receives the message into the RCP cryptography application 220 and using a user-modified RCP that is paired with a matching user-modified RCP on the cryptographic data server 260 decrypts 226 the message. The decrypted message may then be displayed 214 or further processed on each receiving system 210B. Every transmission has only two end-points and each character of every message is uniquely and individually encrypted with a user-modified RCP that is destroyed never to be used again.

TRN pools are supplied by a key provider, which generates the TRN pools on the key server and TRNG hardware 280. In throughput transfers, the TRN pool on the sending system 210A and the cryptographic data server 260 are modified with the same user-defined process such that the key provider no longer knows the information within the TRN pools that are used for encryption and decryption. Similarly, on the receiving side, the TRN pool on the receiving system 210A and the cryptographic data server 260 are modified with the same user-defined process, which may be different from the user-defined modification process used on the sending side.

In these systems where the user-identified randomization process is performed on two different systems, the process selected must be communicated between systems. For example, the selected process may be communicated out of band (e.g., verbally in a telephone call or communicated via text message or E-mail). Moreover, the selected process may be communicated in band (e.g., disguised within the message). For example, a message may contain ten digits, but only one of the digits in the message is used to define a numerical constant to be added to each byte as described above for the simple process of warping the key data elements.

Communication disguises may obliquely refer to personal data known only to the communicants. For example, they could include references to the last four digits of a mutual friend's mobile number, a golf score on a recent outing, or the outcome of a tournament in which they played. There are any number of obscure data points which are not public and known only to people with a common relationship. For business associates without deep personal bonds these could include a phone extension in a conference room they both know or an entry code to the restroom.

Figure 3:
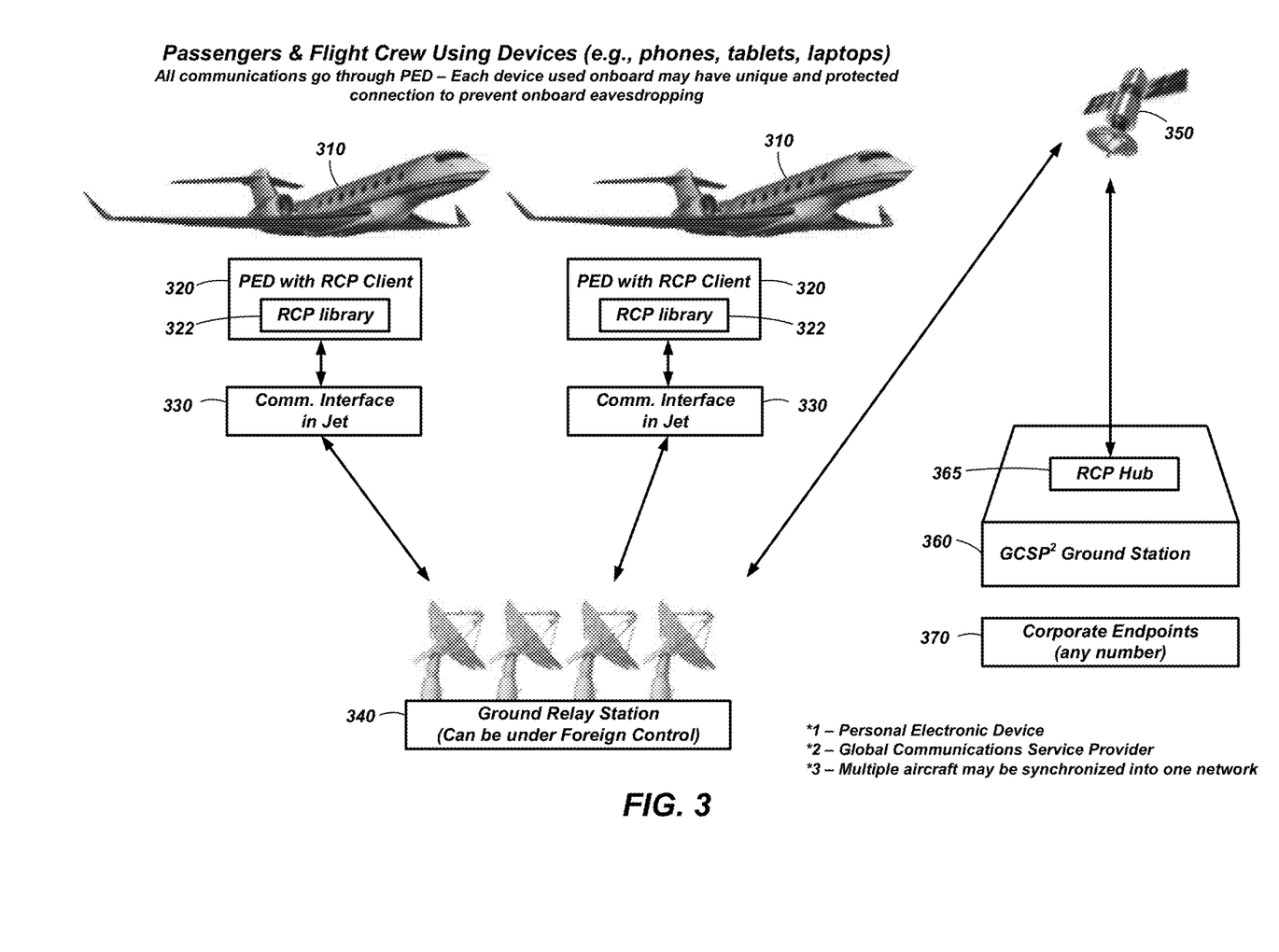
FIG. 3 is a block diagram illustrating an aircraft communication system using one or more embodiments of the present disclosure.

FIG. 3 is a block diagram illustrating an aircraft communication system using one or more embodiments of the present disclosure. In such an application, bandwidth may be a precious commodity. The connection speeds are not great and the costs are astounding.

The embodiments of FIG. 3 include a carry-aboard Personal Electronic Device (PED) 320 as an RCP system including a pre-loaded RCP library that has been modified by the user in the bulk modification process described above. This pre-loading eliminates the need to upload relatively bandwidth intensive RCPs. Business aviation communications are generally handled by private vendors. In order for an aircraft 310 to have connectivity it must be fitted out with all the required communication interfaces 330, such as, for example, WiFi routers, modems transceivers, and antennas (collectively shown as element 330) to principally communicate with ground relay stations 340 or satellites 350 along their route of flight. From ground stations 340, the traffic may be beamed up to a satellite 350 for transmission to a Global Communications Service Provider (GCSP) 360.

However, many global ground relay stations 340 are government owned and operated and many of those governments are not particularly friendly with the United States. For this reason, most sophisticated business aviation operators know by whom and where their ground relay is being handled. Most of these operators will physically turn off the system when entering into unfriendly areas (e.g., China). That said, many of these same operators spend a great deal of flight time over China and want to be productive with their time. Some GCSPs 360 now are utilizing 256-bit encryption, which has or will be broken by quantum computing.

In addition, all the communication gear 330 on the aircraft 310 for the GCSP 360 is costly and proprietary in that it only works with the systems of the company who installed the system. This proprietary result is largely due to FAA regulations, which very closely supervise any hardware installed or attached to an aircraft 310. For each specific make & model piece of equipment installed on any make or model aircraft 310 the vendor must obtain FAA certification called a Supplemental Type Certificate (STC). The company that pays to develop and obtain the STC then owns it for all install of that particular equipment on that particular aircraft type. Any competitor must either buy access to the STC and the specific equipment may not work with their operation or develop their own STC.

In some embodiments, an interfacing device in the form of a Personal Electronic Device (PED) 320 is carried onboard the aircraft 310. This PED 320 may be carried in a manner similar to a Kindle, laptop, or tablet on a commercial flight, and does not require specific FAA authorization or an STC. It is not physically attached to the aircraft, but a portable device. The PED 320 contains a large user-modified RCP library and RCP client as described above, and may include separate wireless network platforms. A first network (e.g., sub-WiFi or Bluetooth), is to connect with the executive's and crew's laptops/tablets with the PED 320. From there, encrypted traffic is passed by the PED 320 to the aircraft communication channel (e.g., WiFi) and from there normally to a ground relay station 340. Of course, over oceans this link may have to go direct to a satellite 350. The GCSP 360 equipment may handle these decisions.

Eventually the traffic is downlinked to the GCSP 360 operations center, most have several globally distributed locations. In some embodiments, the RCP hub 365 would be located at the GCSP 360 OpCenter where final decryption may take place.

An alternative system could have the RCP hub 365 located at a corporate headquarters. In this instance, traffic passing through the RCP hub 365 could be simply passed on by any communications system to headquarters as it is still fully encrypted until reaching the RCP hub 365. Any of these structured RCP hub 365 architectures could accept encrypted traffic, transfer it to a RCP hub 365 and send it out to any authorized RCP hub 365 end-point.

The cost benefit of having the RCP hub 365 co-located at the GCSP 360 OpCenter is that instead of the RCP hub 365 supporting just one corporation a somewhat enhanced RCP hub 365 may support many different corporations simultaneously. Thus, having a single RCP hub 365 owned and operated by a single entity who in turn sells the service to many separate companies through a channel partnership relationship.

Figure 4:
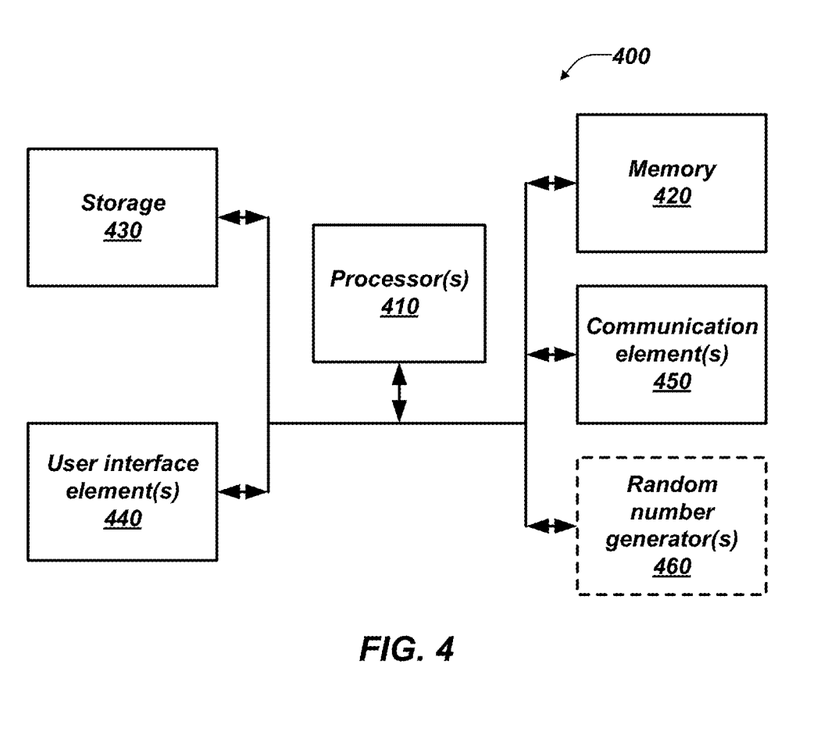
FIG. 4 is a block diagram illustrating a computing system for practicing embodiments of the present disclosure.

FIG. 4 illustrates a computing system 400 for practicing embodiments of the present disclosure. As non-limiting examples, the computing system 400 may be a user-type computer, a file server, a compute server, a notebook computer, a tablet, a handheld device, a mobile device, or other similar computer system for executing software. Computer, computing system, and server may be used interchangeably herein to indicate a system for practicing embodiments of the present disclosure. The computing system 400 is configured for executing software programs containing computing instructions and includes one or more processors 410, memory 420, storage 430, user interface elements 440, and one or more communication elements 450. Some embodiments of the computing system 400 may include one or more random number generators 460 as explained more fully above in connection with FIGS. 1 through 3.

The one or more processors 410 (also referred to herein as processing circuitry) may be configured for executing a wide variety of operating systems and applications including computing instructions for carrying out embodiments of the present disclosure.

The memory 420 may be used to hold computing instructions, data structures, and other information for performing a wide variety of tasks including performing embodiments of the present disclosure. By way of example, and not limitation, the memory 420 may include Synchronous Random Access Memory (SRAM), Dynamic RAM (DRAM), Read-Only Memory (ROM), flash memory, and the like.

The memory 420 may include other types of memory devices, including volatile storage devices or non-volatile storage devices, configured to store information. Examples of other types of memory 420 include Nano RAM or (NRAM), nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), magneto-resistive RAM (MRAM), phase change RAM (PCRAM), phase change memory, or other solid-state storage media.

The storage 430 may be used for storing relatively large amounts of non-volatile information for use in the computing system 400 and may be configured as one or more storage devices. By way of example, and not limitation, these storage devices may include computer-readable media (CRM). This CRM may include, but is not limited to, magnetic and optical storage devices such as disk drives, magnetic tapes, optical storage drives such as CDs (compact disks), DVDs (digital versatile discs or digital video discs), and other equivalent storage devices.

Information related to the computing system 400 may be presented to, and received from, a user with one or more user interface elements 440. As non-limiting examples, the user interface elements 440 may include elements such as displays, keyboards, mice, joysticks, haptic devices, microphones, speakers, cameras, and touchscreens. A display on the computing system may be configured to present a graphical user interface (GUI) with information about the embodiments of the present disclosure.

The communication elements 450 may be configured for communicating with other devices or communication networks. As non-limiting examples, the communication elements 450 may include elements for communicating on wired and wireless communication media, such as for example, serial ports, parallel ports, Ethernet connections, universal serial bus (USB) connections IEEE 1394 ("firewire") connections, lightning connections, thunderbolt connections, Bluetooth wireless connections, 802.1 a/b/g/n type wireless connections, cellular phone connections, TCP/IP, FTP, HTTP, and other suitable communication interfaces and protocols.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

By way of non-limiting example, computing instructions for performing the processes may be stored on the storage 440, transferred to the memory 420 for execution, and executed by the processors 410. The processors 410, when executing computing instructions configured for performing the processes, constitutes structure for performing the processes and can be considered a special-purpose computer when so configured. In addition, some or all portions of the processes may be performed by hardware specifically configured for carrying out the processes.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software, stored on a physical storage device 430 (e.g., a computer readable storage medium), in memory 420, or a combination thereof for execution by various types of processors.

An identified module of executable code may, for instance, comprise one or more physical or logical blocks of computer instructions, which may, for instance, be organized as a thread, object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage devices 430 or memory 420 devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. One example of a non-transitory storage device includes a read-only memory (ROM) that can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the disclosure as contemplated by the inventor.

Non-limiting embodiments of the present disclosure may include: A computer-implemented method for performing cryptographic procedures includes providing for storage on a computing system a Random Number (RN) pool (e.g., a True Random Number (TRN) pool). The RN pool includes key data elements of truly random numbers in a pool of individually addressable files supplied by a RN provider. The method also includes providing one or more user-identified randomization processes to the computing system. The one or more user-identified randomization processes are configured for control by a key consumer associated with the computing system and configured to modify the RN pool with a user-specific modification to produce a variation to the RN pool such that the key data elements are used in a customized state unknown to the RN provider. The customized state includes a difference in number, a difference in order, a difference in values, or combinations thereof of the key data elements as supplied by the RN provider.

A system is configured for performing cryptographic procedures and comprises a computing system including memory and processing circuitry. The memory is configured to store a Random Number (RN) pool (e.g., a True Random Number (TRN) pool), which includes key data elements of truly random numbers in a pool of individually addressable files supplied by a RN provider. The processing circuitry is operably coupled to the memory and is configured for performing computing instructions to receive from the RN provider computing instructions for one or more user-identified randomization processes configured for control by a key consumer associated with the computing system. The processing circuitry is also configured to perform the computing instructions to perform a user-specific modification of the RN pool using the one or more user-identified randomization processes to modify the RN pool to produce a variation to the RN pool such that the key data elements are used in a customized state unknown to the RN provider. The customized state includes at least one of a difference in number, a difference in order, or a difference in values of the key data elements as supplied by the RN provider.

What is claimed is:

1. A computer-implemented method for performing cryptographic procedures, comprising:
   supplying, by a RN provider for storage on a key consumer computing system, a Random Number (RN) pool, the RN pool comprising key data elements of truly random numbers in a pool of individually addressable files supplied by a RN provider;
   storing the RN pool on the key consumer computer system in an unaltered state such that the RN pool is configured to be utilized by the key consumer to encrypt and/or decrypt data;
   providing one or more user-identified randomization processes to the computing system for selective use by the key consumer, the one or more user-identified randomization processes configured for control by the key consumer associated with the computing system and configured to modify the RN pool with a user-specific modification to produce a same size variation of the RN pool such that the key data elements are used in a customized state known only to the key consumer and unknown to the RN provider and any intermediaries supplying the RN pool to the key consumer, wherein the customized state comprises a difference in number, a difference in order, a difference in values, or combinations thereof of the key data elements as supplied by the RN provider;
   and
   after the key consumer has applied the user-specific modification to the RN pool, enabling the key consumer to use the modified RN pool in at least one of an encryption process or decryption process.

2. The method of claim 1, wherein providing, for storage on the computing system, comprises providing the RN pool to the computing system configured as a centralized key customizer and further comprising configuring the centralized key customizer to send the RN pool in the customized state to one or more encryption systems as a modified RN pool.

3. The method of claim 2, further comprising:
   providing the modified RN pool to a first computing system and a second computing system of the one or more encryption systems;
   configuring the one or more encryption systems to:
     combine clear text and key data elements of the modified RN pool on the first computing system with an encryption operation to produce encrypted text;
     transmit the encrypted text from the first computing system;
     receive the encrypted text on the second computing system; and
     combine the encrypted text and key data elements of the modified RN pool on the second computing system with a decryption operation to produce decrypted text;
   wherein:
     the same key data elements of the modified RN pool are configured to be used in the same order for the encryption operation on the first computing system and the decryption operation on the second computing system; and the decryption operation is configured to be the same as the encryption operation.

4. The method of claim 1, further comprising enabling the computing system to:
use the RN pool in the customized state as a sequence of transmit key data elements;
combine a clear text data stream with the sequence of transmit key data elements using an encryption operation to produce an encrypted data stream; and
transmit the encrypted data stream.

5. The method of claim 1, further comprising:
providing for storage on a second computing system a second copy of the RN pool; and
providing the one or more user-identified randomization processes to the second computing system, the one or more user-identified randomization processes configured for control by a key consumer associated with the second computing system to modify the second copy of the RN pool such that the second copy of the RN pool on the second computing system matches the RN pool on the computing system.

6. The method of claim 5, further comprising communicating the user-specific modification to be performed between the computing system and the second computing system in a concealed manner either in band with an encrypted data stream or out of band through a separate communication method such that the same user-specific modification can be used in a synchronized manner with a clear text data stream on the computing system and the encrypted data stream on the second computing system.

7. The method of claim 1, wherein at least one of the one or more user-identified randomization processes comprises rearranging elements of the RN pool in a pre-defined order selected by the key consumer.

8. The method of claim 1, wherein at least one of the one or more user-identified randomization processes comprises selecting a pre-defined subset of elements of the RN pool selected by the key consumer to create a subset of key data elements for cryptographic procedures.

9. The method of claim 1, wherein at least one of the one or more user-identified randomization processes comprises modifying one or more of the elements in the RN pool with a pre-defined warping function selected by the key consumer.

10. The method of claim 1, wherein at least one of the one or more user-identified randomization processes comprises one or more of substituting, modifying, or rearranging individual key data elements or blocks of elements in the RN pool.

11. A system configured for performing cryptographic procedures, comprising:
a key consumer computing system, comprising:
memory configured to store a Random Number (RN) pool, the RN pool comprising key data elements of truly random numbers in a pool of individually addressable files supplied by a RN provider in an unaltered state; and
processing circuitry operably coupled to the memory and configured for performing computing instructions to:
selectively receive computing instructions for one or more user-identified randomization processes configured for control by a key consumer associated with the computing system;
in response to the selectively received computing instructions from the key consumer, perform a user-specific modification of the RN pool using the one or more user-identified randomization processes to modify the RN pool to produce a variation to the RN pool such that the key data elements are used in a customized state unknown to the RN provider and any intermediaries supplying the RN pool to the key consumer, wherein the customized state comprises at least one of a difference in number, a difference in order, or a difference in values of the key data elements as supplied by the RN provider; and
after the user-specific modification to the RN pool, enabling the key consumer to use the modified RN pool in at least one of a subsequent encryption process or a subsequent decryption process.

12. The system of claim 11, wherein the computing system is configured as a centralized key customizer and the processing circuitry is further configured for performing the computing instructions to send the RN pool in the customized state to one or more encryption systems as a modified RN pool for use to encrypt clear text, decrypt encrypted text, or a combination thereof.

13. The system of claim 12, further comprising:
a sending system as one of the one or more encryption systems, comprising:
second memory configured for storing the modified RN pool; and
second processing circuitry operably coupled to the second memory and configured for performing computing instructions to:
receive and store the modified RN pool;
combine the clear text and key elements of the modified RN pool with an encryption operation to produce encrypted text; and
transmit the encrypted text; and
a receiving system as one of the one or more encryption systems, comprising:
third memory configured for storing the modified RN pool; and
third processing circuitry operably coupled to the third memory and configured for performing computing instructions to:
receive and store the modified RN pool;
receive the encrypted text; and
combine the encrypted text and key elements of the modified RN pool with a decryption operation to produce decrypted text;
wherein:
the same key elements of the modified RN pool are used in the same order for the encryption operation on the sending system and the decryption operation on the receiving system; and
the decryption operation is the same as the encryption operation.

14. The system of claim 11, wherein the processing circuitry is further configured for performing the computing instruction to:
use the RN pool in the customized state as a sequence of transmit key data elements;
combine a clear text data stream with the sequence of transmit key data elements using an encryption operation to produce an encrypted data stream; and
transmit the encrypted data stream.

15. The system of claim 11, further comprising a second computing system, comprising:
second memory configured to store a second copy of the RN pool; and
second processing circuitry operably coupled to the second memory and configured for performing computing instructions to:

receive from the RN provider the one or more user-identified randomization processes configured for control by a key consumer associated with the second computing system; ad perform the user-specific modification of second copy of the RN pool using the one or more user-identified randomization processes to modify the second copy of the RN pool to substantially match the RN pool of the computing system.

16. The system of claim 15, wherein the processing circuitry and the second processing circuitry are further configured to communicate the user-specific modification to be performed between the computing system and the second computing system in a concealed manner either in band with an encrypted data stream or out of band through a separate communication method such that the same user-specific modification can be used in a synchronized manner with a clear text data stream on the first computing system and the encrypted data stream on the second computing system.

17. The system of claim 11, wherein at least one of the one or more user-identified randomization processes comprises selecting a pre-defined subset of elements of the RN pool selected by the key consumer to create a subset of key data elements for cryptographic procedures.

18. The system of claim 11, wherein at least one of the one or more user-identified randomization processes comprises one or more of substituting, modifying, or rearranging individual key data elements or blocks of elements in the RN pool.

* * * * *